United States Patent [19]

Durand et al.

[11] Patent Number: 4,929,063
[45] Date of Patent: May 29, 1990

[54] NONLINEAR TUNABLE OPTICAL BANDPASS FILTER

[75] Inventors: William W. Durand, Edina; Ronald E. Peterson, Shoreview, both of Minn.

[73] Assignee: Honeywell Inc., Minneapolis, Minn.

[21] Appl. No.: 821,291

[22] Filed: Jan. 22, 1986

[51] Int. Cl.$^5$ .............. G02B 5/28; G02F 1/23; G02F 1/01
[52] U.S. Cl. ................... 350/353; 350/164; 350/354
[58] Field of Search ........... 350/164, 353–354, 350/356, 385–386, 392; 356/352; 427/164; 250/339

[56] References Cited

U.S. PATENT DOCUMENTS

| | | | |
|---|---|---|---|
| 2,420,956 | 5/1947 | Kremers et al. | 427/164 |
| 2,498,694 | 2/1950 | Mast | 524/732 |
| 2,808,351 | 10/1957 | Colbert et al. | 428/212 |
| 3,164,665 | 1/1965 | Stello | 350/356 |
| 3,397,023 | 8/1968 | Land | 350/354 |
| 3,439,974 | 4/1969 | Henry et al. | 350/372 |
| 3,535,022 | 10/1970 | Duchateau et al. | 350/359 |
| 3,556,640 | 1/1971 | Austin | 350/164 |
| 3,573,653 | 4/1971 | Smiley | 350/356 |
| 3,579,130 | 5/1971 | Smiley | 350/164 |
| 3,656,836 | 4/1972 | de Cremoux et al. | 350/355 |
| 3,712,711 | 1/1973 | Adachi | 350/164 |
| 3,726,585 | 4/1973 | Fedotowsky et al. | 350/356 |
| 3,801,185 | 4/1974 | Ramaswamy et al. | 350/359 |
| 4,106,857 | 8/1978 | Snitzer | 350/311 |
| 4,377,324 | 3/1983 | Durand et al. | 350/166 |
| 4,400,058 | 8/1983 | Durand et al. | 350/166 |
| 4,615,619 | 10/1986 | Fateley | 350/353 |

OTHER PUBLICATIONS

Bruesch et al., "Optical Properties of $\alpha$-Ag$_2$S and $\beta$-Ag$_2$S in the Infrared & Far-Infrared" Solid State Comm., vol. 13, 1973, pp. 9–12.

Weiser et al., "Optically Erasing a Thermally Biased Thermally Switchable Film" IBM Tech. Disc. Bull 12-1973, pp. 2075–2076.

News, "All-Optical GaAs Chip: Bistable at Room Temperature" Electro-Optical Systems Design, 5-1982, p. 12.

Rozhdestvenskii et al., "Antireflection Coatings on Items Made From Gallium Arsenide", Sov. J. Opt. Tech. 5-1980, pp. 305–306.

Weil, R., "Interference of 10.6-$\mu$ Coherent Radiation in a 5-cm Long Gallium Arsenide Parallelepiped", Jr. App. Phys., 6-1969, pp. 2857–2859.

Primary Examiner—William H. Punter

[57] ABSTRACT

A nonlinear tunable optical bandpass filter of the Fabry-Perot type is disclosed comprising an optically transparent substrate and a plurality of multilayer coatings deposited on a facing side of the substrate. One of the coating layers comprises a spacer being a nonlinear optical coating material having an externally-variable refractive index. The spacer is bounded on two ends by structures of multilayer stacks being alternating thin films of transparent, physically compatible materials. The filter of the invention can be tuned to pass various transmittance wavelengths through the application of external activation apparatus, such as heating by a laser acting on the spacer.

3 Claims, 1 Drawing Sheet

NONLINEAR TUNABLE OPTICAL BANDPASS FILTER

BACKGROUND OF THE INVENTION

I. Field of the Invention:

This invention relates generally to Fabry-Perot optical bandpass filters, and more particularly to a nonlinear tunable optical bandpass filter.

II. Discussion of the Prior Art:

As those skilled in the art will appreciate, conventional Fabry-Perot filters employ two windows with a high reflective coating on adjacent faces which are separated by a spacer having a distance on the order of the transmittance wavelength. Such filters transmit light waves at a maximum wavelength of twice the spacer optical thickness. Light is also transmitted at shorter wavelengths which are integer fractions of this maximum wavelength (i.e., $\frac{1}{2}$, $\frac{1}{3}$, $\frac{1}{4}$, etc.).

U.S. Pat. No. 4,400,058 discloses a tunable Fabry-Perot filter for transmitting light in the wavelength range from 3-40 microns. In that invention, a pair of low index substrates of refractive index less than 2.4 were positioned between an ajustable spacer means. A non-metallic coating of refractive index of at least 4.0 was deposited on the facing sides of the substrates. Tuning was accomplished by mechanically adjusting the spacer means.

U.S. Pat. No. 4,377,324 discloses another Fabry-Perot type device comprising a pair of low index substrates mounted in parallel relationship so as to present facing sides to each other in an optical path. A coating is placed on the facing sides of each substrate, the coating having an increasing index of refraction away from the sides. Adjustment means are provided to adjust the distance between the two faces, at least from a distance of substantially less than a desired wavelength to at least one-half of the desired wavelength.

U.S. Pat. No. 3,556,640 to Austin discloses a Fabry-Perot type interference filter having a double half-wave configuration. This invention allows precise spectral location of narrow (on the order of 0.1 Angstrom) passbands. Fine adjustment of the transmittance wavelength is obtained using "tuning layers" which are vacuum deposited films fabricated prior to the filter assembly. No spectral tuning or switching is possible with the device.

Other prior art devices have incorporated the properties of conventional Fabry-Perot filters to achieve light modulation, optical switching and narrow passband filters. However, these prior art devices generally are either not solid state devices or are constrained by factors such as transmission of only monochromatic light, use of very thick or very thin active layers, use of polarizers, and precise control of radiation angle of incidence. Prior art devices generally allow only limited tuning over narrow spectral ranges.

SUMMARY OF THE INVENTION

It has now been discovered that a new nonlinear tunable optical bandpass filter having the Fabry-Perot type configuration can be obtained employing the principles of the present invention. By the use of a nonlinear optical material (i.e., a material which exhibits a fundamental, nonlinear change in physical and optical properties upon application of external activation stimulus), as further described hereinafter, a new property can be achieved. The nonlinear material is used as a spacer in a filter of Fabry-Perot type construction. The spacer is deposited between two thin-film reflectant coatings. When the spacer thickness is approximately one-half the design wavelength, the usual narrow bandpass band is obtained at ambient temperatures. Broad band spectral radiation incident on the device (normal or at various aspect angles) will be reflected, except for those wavelengths corresponding to the optical thickness of the spacer layer which are transmitted. By controlling activation means applied to the spacer, wavelengths between some $\lambda 1$, and $\lambda 2$ may be transmitted, that is, application of activation means causes a change in the refractive index of the spacer and shifts the filter passband to different wavelengths.

Specifically, a nonlinear tunable optical bandpass filter has been discovered which includes a transparent substrate having a face coated with a plurality of layers of optical coatings. A first coating, which advantageously may be a multilayer reflecting stack structure, is deposited on the face of the substrate. A second, nonlinear optical coating exhibiting the desired transparency and refractive index variation upon activation, is deposited at the boundary of the first coating and in a parallel relationship thereto. Finally, a third coating of the same construction as the first coating is placed at the second boundary of the nonlinear coating such that the nonlinear coating is bounded on both sides by substantially identical coatings. Also provided are activation means to activate the nonlinear optical coating spacer.

Suitable materials for the substrate are silicon dioxide, barium fluoride, potassium chloride, potassium bromide, potassium iodide, cesium bromide, cesium iodide and zinc selenide or other transparent substrate materials The material from which the first and third coatings are made can be a variety of materials having different indexes of refraction ranging from less than about 1.4 to greater than about 5.6. Suitable materials for the first and third coatings include thallium chloride and silver chloride. The material from which the spacer coating is made can be a variety of materials which undergo fundamental nonlinear changes upon external activation, including changing the refractive index of the material. For example, silver sulfide undergoes a nonlinear decrease in refractive index upon the application of heat. Other such materials exhibiting these nonlinear properties are well known by those skilled in the art. As dictated by multilayer thin film design principles, the refractive index contrast between individual layers within the multilayer stacks adjacent to the nonlinear spacer determines overall filter spectral range. The number of alternating layers determines the filter passband width.

BRIEF DESCRIPTION OF THE DRAWINGS

For a more complete understanding of the invention, reference is hereby made to the drawings, in which.

DESCRIPTION OF THE PREFERRED EMBODIMENT

Figure 1:
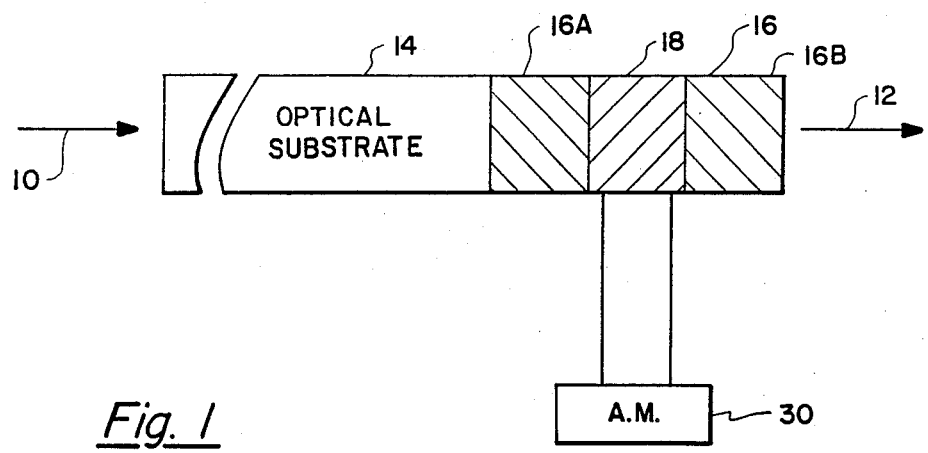
FIG. 1 is a schematic view showing the preferred embodiment of the present invention.

As shown in FIG. 1, light waves 10 are passing through an optical filter device such that a quantity of light passes completely through the device in the direction of arrow 12. The device includes an optically transparent substrate 14. A plurality of layers of coating 16A, 16B and 18 are placed on the facing side of the substrate 14. Coatings 16A and 16B are advantageously multilayer reflecting stacks which are constructed of alternating layers of common thin film coatings. Coating 18 forms a spacer between the multilayer stacks 16A and 16B. Coating 18 is made of a material exhibiting nonlinear optical characteristics upon exposure to activation means. Activation means 30 is applied to the nonlinear optical coating material 18, advantageously raising or lowering the refractive index of coating 18 whereby the passband wavelengths of the filter shown in FIG. 1 shift such that the wavelengths of light passing through the filter 12 are increased or decreased depending upon the refractive characteristics of the nonlinear coating material 18.

In a typical case, the multilayer reflecting stacks 16A and 16B are made from materials compatible with the nonlinear optical coating material 18 chosen. The material 16 can be selected from a wide range of known optical coating materials constrained only by compatibility with the nonlinear optical material 18 and well known multilayer thin film design principles. The number of alternating layers of the multilayer reflecting stacks determines the filter passband width. It can be appreciated that coatings 16A and 16B may also each be a single layer of optical coating material, either metallic or non-metallic depending on overall filter transmission requirements. U.S. Pat. No. 4,377,324 discloses some examples of typical coating materials.

Figure 2:
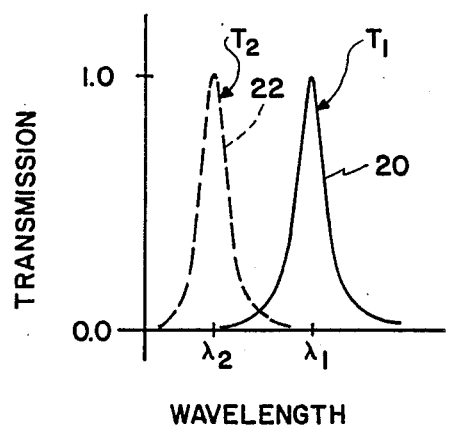
FIG. 2 is a graphical representation of results achieved using the device of FIG. 1.

A filter having thermally activated nonlinear optical layer 18 and a single passband can be used as an example to illustrate the key features shown in FIGS. 1 and 2. Referring to FIG. 2, for this example, the wavelength of light transmitted for ambient temperature T1 less than temperature T2, is the transmittance wavelength $\lambda 1$, as shown by curve 20. In a typical example, upon application of activation means to raise the temperature of the nonlinear coating 18 to temperature T2 greater than T1, the passband shifts to pass light at a wavelength $\lambda 2$ less than $\lambda 1$. The graphical representation of FIG. 2 shows wavelength on the horizontal axis and transmission on the vertical axis. As can be seen by reference to the graph, at temperature T1, the nonlinear tunable optical bandpass filter of the invention, operates in a manner similar to that for a classical tunable Fabry-Perot filter. As activation means 30 is applied to heat the nonlinear optical coating material 18, however, the bandpass wavelength shifts such that wavelength $\lambda 1$ is no longer passed and wavelength $\lambda 2$ is now passed through the filter. It is evident from the above discussion that the bandpass shift may be reversed (i.e., transition from $\lambda 2$ to $\lambda 1$) if the activation means 30 is operated to cool coating layer 18 rather than heat it.

The filter as shown in FIG. 1, typically has a spacer coating with an optical thickness of approximately one-half of the design wavelength. Further, the filter of FIG. 1 may typically have a refractive index of less than 2.4. If thermally activated, activation means may be provided by electrical resistance heating or by a laser device. The passband shift shown in FIG. 2 is continuous over a range of temperatures depending on the non-linear coating selected.

In one embodiment of the invention, a filter was designed according to the present invention for operation in the infrared spectral region. Silver sulfide was chosen as the nonlinear spacer material for the filter since the material exhibited the necessary transparency and appropriate refractive index variation for the intended application. A potassium chloride substrate was chosen for filter deposition. The key vacuum deposition parameters influencing silver sulfide performance were shown to be deposition source type, deposition rate, source stoichiometry and substrate temperature. Clean, high vacuum conditions (pressure less than 1.E−6 Torr) are also required. A quartz thermal evaporation source yielded highest quality films. A one inch diameter cylindrical crucible with approximately one inch depth was used in the deposition process. A Tungsten filament was wound around the cylinder to provide source heating. The crucible was filled approximately three quarters full of stoichiometric silver sulfide. The material charge was gently tapped to settle, but was not tightly packed. Prior to deposition, the crucible was outgassed without producing a detectable silver sulfide evolution rate. Once outgassed, as indicated by vacuum chamber pressure, source temperature was quickly raised to produce deposition rates of a few hundred angstroms per second. (One angstrom per second equals 0.0001 micrometers per second). This rate was held constant throughout deposition of the desired film thickness. A standard quartz crystal monitoring arrangement was used to provide deposition rate and film thickness information. It was found that the silver sulfide material decomposed somewhat under the action of heat. Source stoichiometry, therefore, varied with deposition time. Silver sulfide stoichiometry proved adequately stable for deposition of single films. A temperature near 150° C. was found to yield films with desired microcrystallinity and stoichiometry. Cooler temperatures yielded films with an amorphous appearance and poor optical properties. Higher temperatures yielded more metallic films, also having poor optical properties.

Having selected and demonstrated the nonlinear optical material, silver sulfide, filter design was completed as follows. Based on material compatibility and overall optical characteristics, candidate materials were identified for the construction of multilayer stack structures. As dictated by multilayer thin film design principles, the refractive index contrast between individual layers within the multilayer structures adjacent to the nonlinear layer determines overall filter spectral range. The number of alternating layers determines the filter passband width. In the particular application of interest for this example, overall spectral range was met using thallium chloride (TlCl) and silver chloride (AgCl). These materials are mutually compatible in multilayer form and are compatible with silver sulfide.

In this example of an embodiment of the invention, a four micrometer transmittance wavelength was chosen. Quarter wavelength thicknesses of thallium chloride and silver chloride films were calculated. These thicknesses were 0.38 micrometers and 0.56 micrometer, respectively. At the design transmittance wavelength of four micrometers, the half wavelength silver sulfide film spacer thickness was 0.67 micrometers. Desired passband width was obtained by using four alternating thallium chloride and silver chloride film layers on either side of the silver sulfide layer. The specific filter design was then AgCl/TlCl/AgCl/TlCl/Ag$_2$S/TlCl/AgCl/TlCl/AGCl, deposited on the potassium chloride substrate.

Evaporation sources identical to the one described hereinabove for use with silver sulfide were prepared for the thallium chloride and silver chloride materials. Deposition procedures were similar, except that the rates of about 10 angstroms per second were used for both thallium chloride and silver chloride. Since no stoichiometry variations were found for either material during depositions, some sources were used repeatedly without recharging. As is well known, silver sulfide undergoes nonlinear transition of retractive index through about 200° C. The deposited filter was placed in a scanning spectrophotometer and the spectral filter transmission repeatedly measured while heating with an electrical resistance device. A passband center wavelength shift corresponding to the silver sulfide transition magnitude was observed over temperatures ranging from ambient to above about 200° C. corresponding to the shift shown generally in FIG. 2.

While the specific embodiment of the invention described hereinabove was designed for operation over infrared wavelengths, it will be appreciated by those skilled in the art that through selection of the appropriate nonlinear optical materials and spacer thickness corresponding to the desired passband wavelengths, filters embodying the invention can be constructed for a broad range of optical wavelengths, including wavelengths found in the ultraviolet, visible and infrared wavelength regions. While there has been shown and described a preferred embodiment of the invention, those skilled in the art will appreciate that various changes and modifications may be made to the illustrated embodiment without departing from the true spirit and scope of the invention which is to be determined from the appended claims.

The embodiments of an invention in which an exclusive property or right is claimed are defined as follows:

1. A tunable Fabry-Perot filter comprising:
   a substrate;
   a first coating on said substrate;
   a second coating on said first coating, the second coating having activatable nonlinear optical properties and an optical thickness of one-half of the design transmittance wavelengths at ambient temperatures and wherein the second coating comprises silver sulfide;
   a third coating on said second coating wherein the first and third coatings include material selected from the group consisting of thallium chloride and silver chloride; and
   activation means for changing the optical properties of said second coating so as to tune the filter to a desired wavelength.

2. The device of claim 1 wherein the activation means is provided by electrical resistance heating means.

3. The device of claim 1 wherein the activation means is provided by laser radiation means.

* * * * *